United States Patent
Oikawa (10) Patent No.: US 7,929,228 B2
(45) Date of Patent: Apr. 19, 2011

(54) IMAGE PICKUP APPARATUS HAVING LENS BARREL

(75) Inventor: Keiki Oikawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/878,473

(22) Filed: Sep. 9, 2010

(65) Prior Publication Data
US 2011/0069403 A1      Mar. 24, 2011

(30) Foreign Application Priority Data
Sep. 18, 2009  (JP) .................. 2009-216614

(51) Int. Cl.
*G02B 7/02* (2006.01)
(52) U.S. Cl. ....................................... 359/819; 359/811
(58) Field of Classification Search .................... 359/819
See application file for complete search history.

(56) References Cited

U.S. PATENT DOCUMENTS
2004/0160683 A1*  8/2004  Nomura et al. ............... 359/819
2008/0037144 A1*  2/2008  Uehara .......................... 359/824

FOREIGN PATENT DOCUMENTS
JP         2004-198499 A      7/2004
* cited by examiner Primary Examiner — Jordan M. Schwartz
Assistant Examiner — James C Jones
(74) Attorney, Agent, or Firm — Rossi, Kimms & McDowell LLP (57) ABSTRACT

An image pickup apparatus includes a lens barrel. The lens barrel includes a fixture cylinder fixed onto an image pickup apparatus body, and provided with a plurality of cam grooves, and a movement cylinder provided with a plurality of cam followers, and configured to move in an optical axis direction as the cam follower rotates around an optical axis. One cam groove includes a non-engagement area that is not engaged with the cam follower. When the cam follower is located in the non-engagement area, a supporting member of a fixture cylinder supports in a radial direction a supported member that is provided to a part of the movement cylinder on an image plane side, and a part of the movement cylinder closer to the object side than the supported member is supported by the fixture cylinder in the radius direction via an elastic member.

3 Claims, 9 Drawing Sheets

IMAGE PICKUP APPARATUS HAVING LENS BARREL

BACKGROUND OF THE INVENTION

1. Field of the Invention

The present invention relates to an image pickup apparatus having a multi-stage retractable lens barrel.

2. Description of the Related Art

An image pickup apparatus, such as a digital still camera and a video camera, needs a high magnification of an image pickup lens and a miniaturization of a lens barrel configured to house the image pickup lens is required.

Japanese Patent Laid-Open No. ("JP") 2004-198499 discloses a lens barrel having a so-called two-stage retractable structure. In this lens barrel, a straightforward movement cylinder moves in an optical axis direction which includes three cam followers engaged with three cam grooves in a surrounding wall of a rotational cam ring (fixation/movement cylinder) as a rotation of the motor is transmitted to the rotational cam ring via a cylindrical gear and the rotational cam ring rotates. Since the three cam followers of the rotational cam ring are engaged with three cam grooves in the surrounding wall of the rotational cam ring, the rotational cam ring moves in the optical axis direction while the rotational cam ring rotates. Thereby, a two-stage retractable lens barrel can be realized in which the straightforward movement cylinder and the rotational cam ring can project from and retract into the fixation cam ring (or the image pickup apparatus body).

The lens barrel disclosed in JP 2004-198499 has a perforation groove used to arrange the cylindrical gear on the surrounding wall of the fixation cam ring. In addition, the cam ring in the optical axis direction is long in order to form three cam grooves of the above fixation cam ring in the surrounding wall of the fixation cam ring outside the perforation groove at regular intervals in the circumferential direction.

In order to shorten the length of the fixation cam ring in the optical axis direction, one of the three cam grooves, for example, may be formed so that its partial area can be eliminated by the perforation groove. However, when the cam follower is slipped off from the cam groove in the imperfect area (non-engagement area), the rotational cam ring is likely to incline or decenter relative to the optical axis even when the other cam followers are engaged with the other two cam grooves.

SUMMARY OF THE INVENTION

An image pickup apparatus according to one aspect of the present invention includes a lens barrel. The lens barrel includes a fixture cylinder fixed onto an image pickup apparatus body, the fixture cylinder including a supporting member and a plurality of cam grooves, a movement cylinder that includes a plurality of cam followers and a supported member that is provided to a part of the movement cylinder on an image plane side, and is configured to move in an optical axis direction as the cam follower rotates around an optical axis, and an elastic member. One of the plurality of cam grooves has a non-engagement area in which the cam follower is not engaged with the one cam groove. When the cam follower is located in the non-engagement area, the supporting member of the fixture cylinder supports in a radial direction the supported member of the movement cylinder, and a part of the movement cylinder closer to the object side than the supported member is supported by the fixture cylinder in the radius direction via the elastic member.

Further features of the present invention will become apparent from the following description of exemplary embodiments with reference to the attached drawings.

DESCRIPTION OF THE EMBODIMENTS

Referring now to the accompanying drawings, a description will be given of an embodiment according to the present invention.

Figure 1:
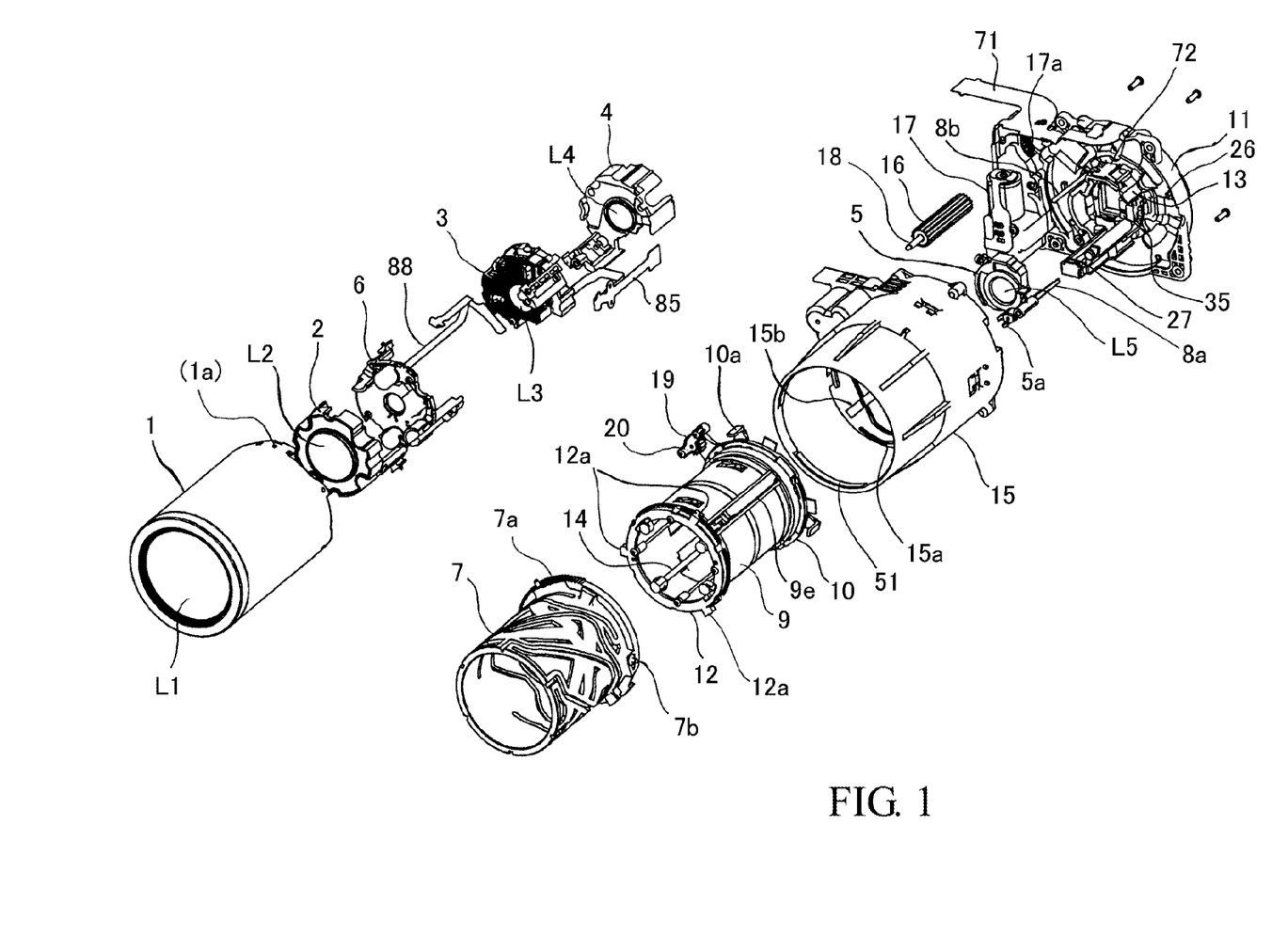
FIG. 1 is an exploded perspective view of a lens barrel of an image pickup apparatus according to one embodiment of the present invention.
Figure 2:
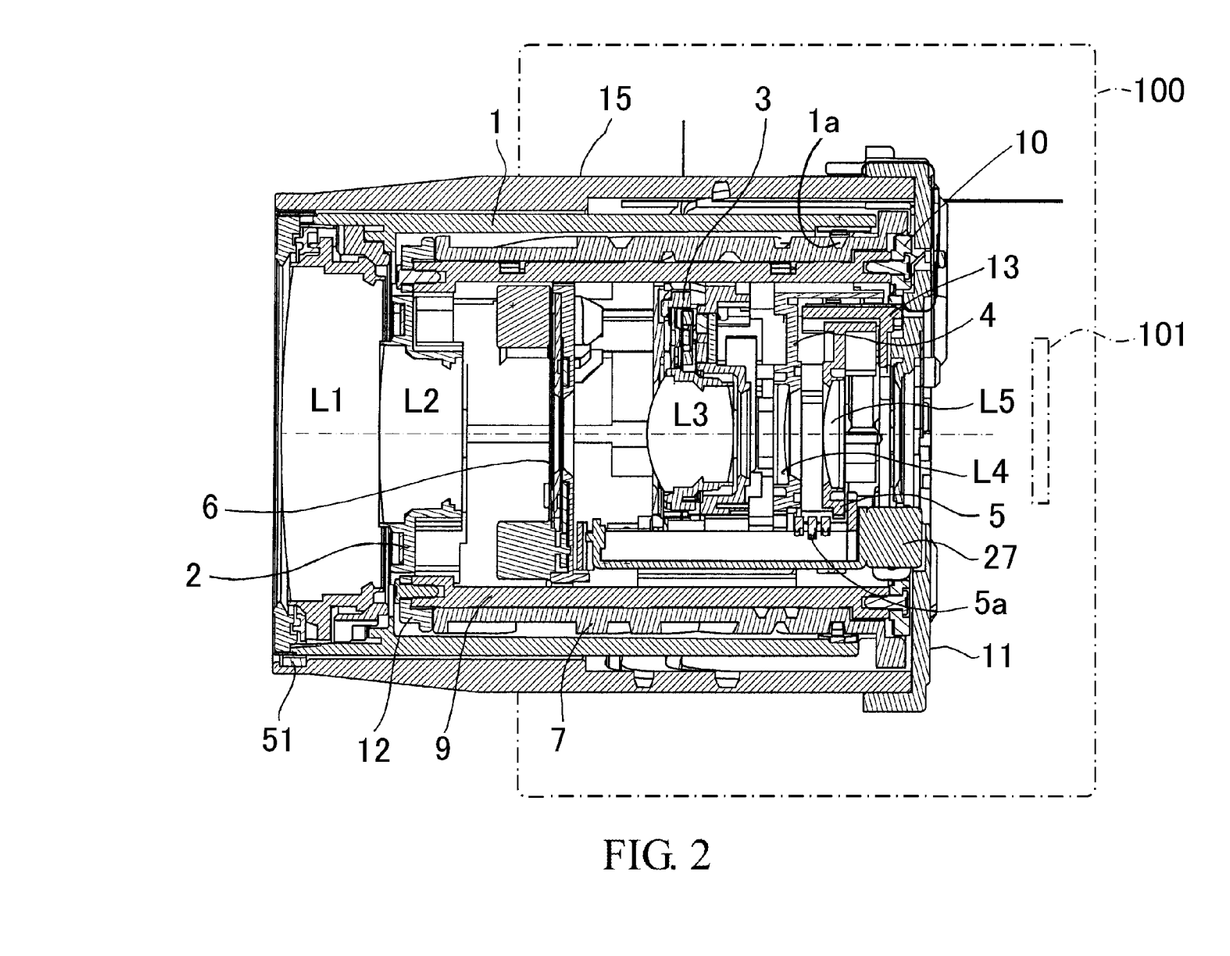
FIG. 2 is a sectional view of a retraction state of the lens barrel according to this embodiment.
Figure 3:
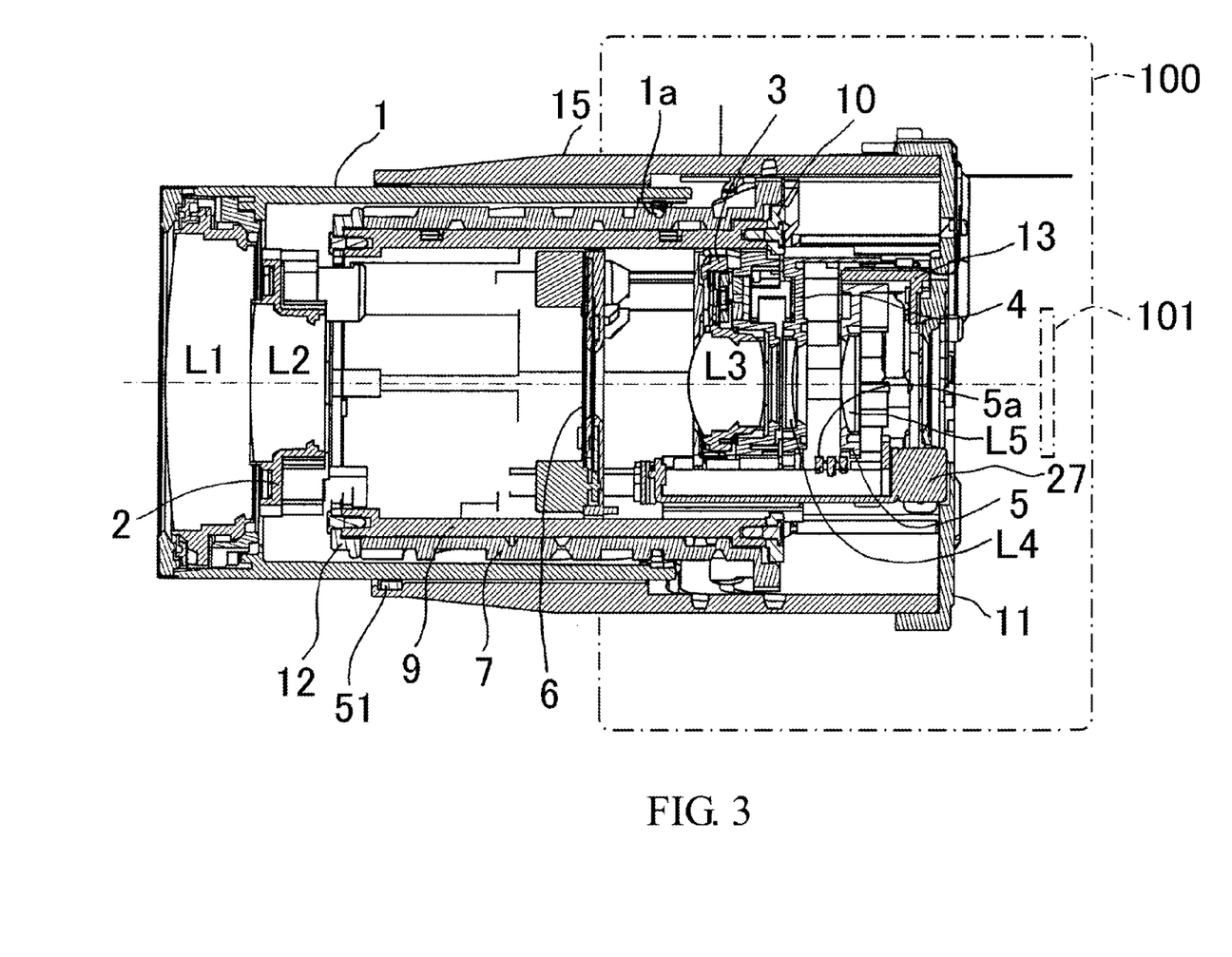
FIG. 3 is a sectional view of a wide-angle end state of the lens barrel according to this embodiment.
Figure 4:
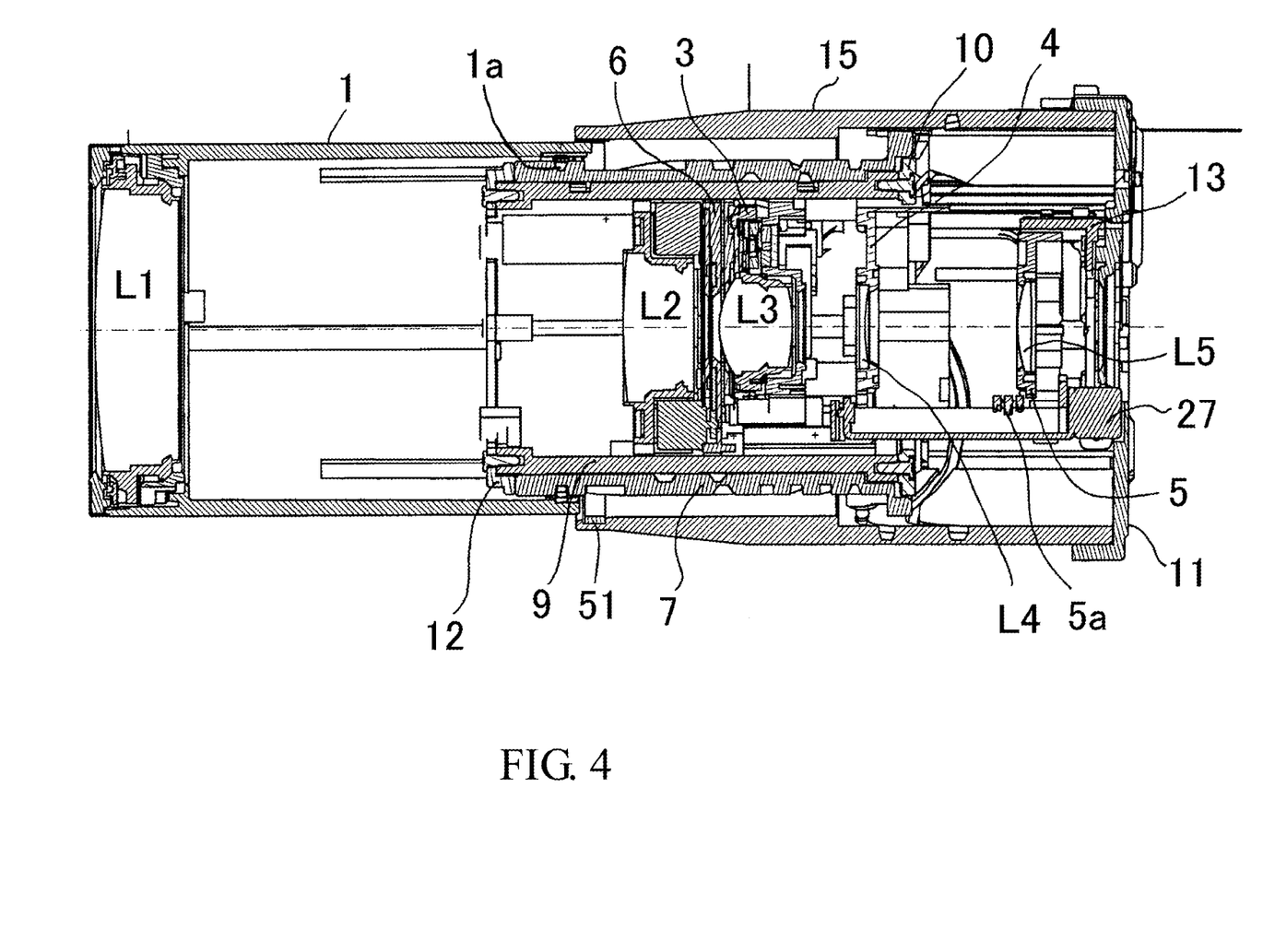
FIG. 4 is a sectional view of a telephoto end state of the lens barrel according to this embodiment.

FIG. 1 illustrates an exploded multi-stage (two-stage) retractable lens barrel for a digital still camera (image pickup apparatus) according to one embodiment of the present invention. FIGS. 2, 3, and 4 illustrate sections of a retraction state, a wide-angle end state, and a telephoto end state of the lens barrel. In FIGS. 2 and 3, reference numeral 100 denotes a camera body (image pickup apparatus body), and reference numeral 101 denotes an image pickup device configured to photoelectrically convert an object image formed by an image pickup optical system in the lens barrel.

In FIG. 1, L1 denotes a first lens unit, and L2 denotes a second lens unit. L3 denotes a third lens unit that serves as an image stabilization optical system configured to shift in a plane orthogonal to the optical axis and for an image stabilization correction. L4 denotes a fourth lens unit, and L5 denotes a fifth lens unit configured to move in the optical axis direction for focusing. The first lens unit L1 to the fifth lens unit L5, and a stop/shutter unit, which will be described later, constitute the image pickup optical system.

Reference numeral 1 denotes a first lens barrel configured to hold the first lens unit L1. Reference numeral 2 denotes a second holder frame configured to hold the second lens unit L2. Reference numeral 3 denotes a shift unit configured to shift the third lens unit L3 in the plane orthogonal to the optical axis. Reference numeral 4 denotes a fourth holder frame configured to hold the fourth lens unit L4. Reference numeral 5 denotes a fifth holder frame configured to holder the fifth lens unit L5.

The first barrel 1 that holds the first lens unit L1 is also referred to as a first optical unit. Each of the second holder frame 2 that holds the second lens unit L2, the stop/shutter unit 6, the shift unit 3, and the fourth holder frame 4 that holds the fourth lens unit L4 will be referred to as a second optical unit.

Reference numeral 6 denotes a stop/shutter unit configured to adjust a light quantity. Reference numeral 11 denotes an image pickup device holder to which the image pickup device 101 and a zoom motor unit 17 are attached.

Reference numerals 8a and 8b are guide bars as a rod-shaped guide member configured to guide the fifth holder frame 5 in the optical axis direction. A sleeve provided to the fifth holder frame 5 is engaged with the guide bar 8a movably in the optical axis direction, and a U-shaped groove formed in the fifth holder frame 5 is engaged with the guide bar 8b movably in the optical axis direction. Since the U-shaped groove is engaged with the guide bar 8b, a rotation of the fifth holder frame 5 around the guide bar 8a is prohibited.

Reference numeral 27 denotes a focus motor as a driving source configured to move the fifth holder frame 5 in the optical axis direction. A lead screw is formed onto the output shaft of the focus motor 27, and a rack 5a attached to the fifth holder frame 5 is engaged with the lead screw. Thereby, a rotation of the lead screw is converted into a straightforward movement of the fifth holder frame 5.

Reference numeral 35 denotes a photo-interrupter configured to detect an initial position of the fifth holder frame 5. When a light shield formed on the fifth holder frame 5 is inserted into a space between a light emitter and a light receiver of the photo-interrupter 35, a movement of the fifth holder frame 5 to the initial position is detected.

Reference numeral 13 is a back barrel fixed onto the image pickup device holder 11, onto which the focus motor 27 and the photo-interrupter 35 are screwed. The image pickup device holder 11 supports one end of each of the guide bars 8a and 8b.

Reference numeral 15 denotes a fixture cam ring (fixture cylinder or first cam cylinder) fixed onto the image pickup device holder 11 via a plurality of screws. Reference numeral 7 denotes a driving cam ring (rotational cylinder or second cam cylinder), which can rotate around the optical axis and move in the optical axis direction. A plurality of cam grooves (fixture cams) 15a are formed in the inner circumference surface of a surrounding wall of the fixture cam ring 15 and configured to move the driving cam ring 7 in the optical axis direction. Although this embodiment provides three cam grooves 15a, four or more cam grooves may be provided.

Figure 9:
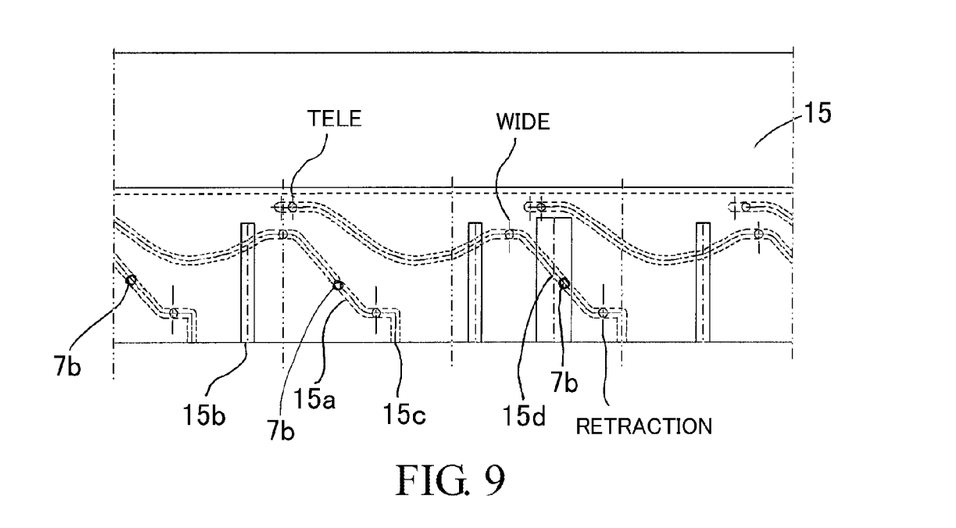
FIG. 9 is a developed view that illustrates an inner circumferential surface of a fixture cam ring of the lens barrel according to this embodiment.

The three cam grooves 15a mutually have the same shape (locus), as illustrated in FIG. 9. In addition, a cam pin insertion opening 15c configured to introduce three cam pins (cam followers) 7b provided to the driving cam ring 7 into the cam groove 15a is formed at the back end of the surrounding wall of the fixture cam ring 15.

Figure 10:
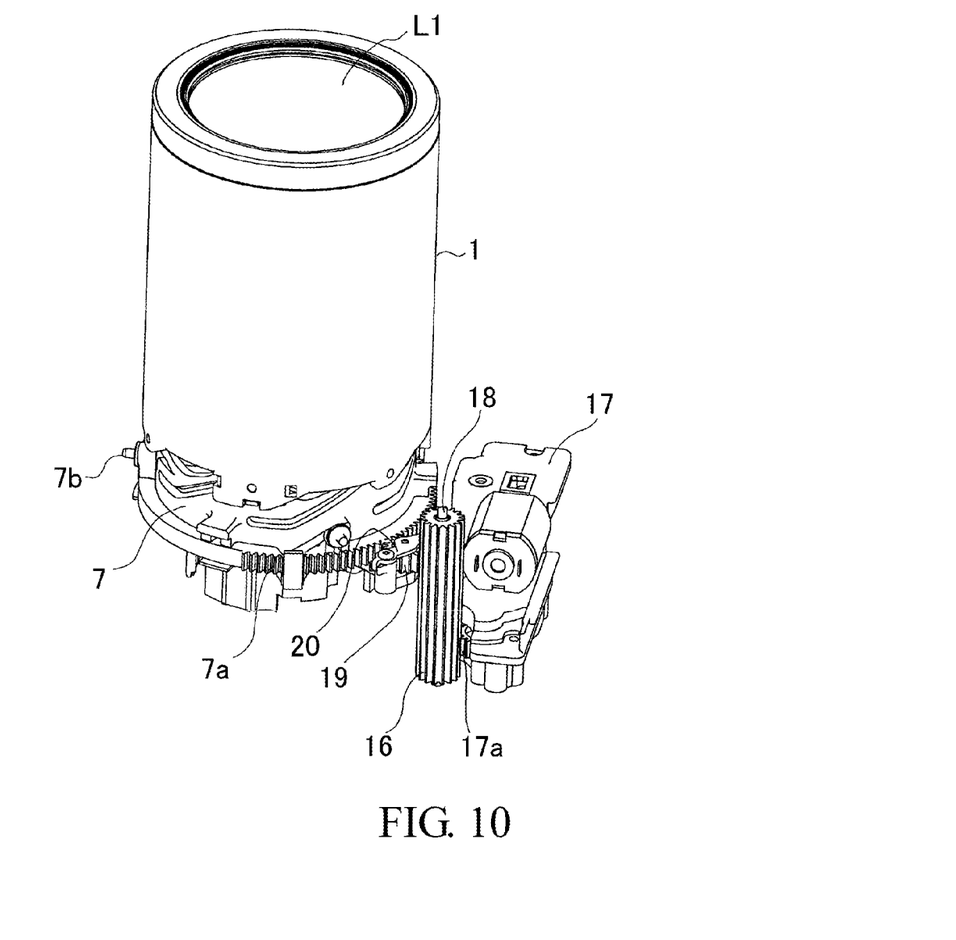
FIG. 10 is a perspective view of the lens barrel according to this embodiment.

As illustrated in FIG. 10, an output gear 17a of the zoom motor unit 17 is engaged with a spur gear 16 and transmits a rotation to the spur gear 16. The spur gear 16 is engaged with a movement gear 19 engaged with a cam gear 7a formed on the driving cam ring 7 and transmits a rotation to the movement gear 19. Thereby, the driving cam ring 7 rotates around the optical axis.

As the driving cam ring 7 rotates, the driving cam ring 7 whose cam pins 7b are engaged with the cam grooves 15a of the fixture cam ring 15 moves in the optical axis direction in order of and in reverse order of the retraction position, the wide-angle end position, and the telephoto end position. The retraction position is an accommodation position in which the driving cam ring 7 is housed in the fixture cam ring 15 (or the camera body 100). The wide-angle end position is an image pickup standby position at which the driving cam ring 7 projects from the fixture cam ring 15 (camera body 100) so as to wait for image pickup (zooming) after the camera is powered on.

The driving cam ring 7 is rotatably supported around the optical axis on the outer circumferential surface of the straightforward movement guidance cylinder 9 that is as a straightforward movement cylinder. A movement of the driving cam ring 7 in the optical axis direction relative to the straightforward movement guidance cylinder 9 is prohibited by a key ring 12 attached to the front end of the straightforward movement guidance cylinder 9 (part on the object side) and a flange formed on the back end of the straightforward movement guidance cylinder 9 (part on the image plane side). A bar holder 10 is fixed on the back end of the straightforward movement guidance cylinder 9.

The straightforward movement guidance cylinder 9, the driving cam ring 7, the key ring 12, and the bar holder 10 constitute a movement cylinder (movement cylinder unit) configured to move as a whole in the optical axis direction along with a rotation of the driving cam ring 7 (cam pins 7b) around the optical axis. The first barrel 1 may be included in the movement cylinder (movement cylinder unit).

Three straightforward movement keys 10a each of which serves as a supported member are provided on the bar holder 10 at regular intervals of 120° in the circumferential direction. These straightforward movement keys 10a are engaged with three straightforward movement grooves 15b movable in the optical axis direction each of which serves as a supporting member, and these three straightforward movement grooves 15b are formed in the inner circumferential surface of the fixture cam ring 15 at regular intervals of 120° in the circumferential direction. Due to the engagements between the straightforward movement keys 10a and the straightforward movement grooves 15b, radial positions of the straightforward movement guidance cylinder 9 and the driving cam ring 7 are determined so that the straightforward movement guidance cylinder 9 and the driving cam ring 7 cannot decenter from the optical axis.

The movement gear 19 is attached to a movement gear holder plate 20. While the driving cam ring 7 is being rotated, the driving cam ring 7 is moved with the straightforward movement guidance cylinder 9, the bar holder 10, the key ring 12, and the driving gear 19 to a position in the optical axis direction determined by the cam groove 15a. The movement gear 19 is engaged with the spur gear 16 whenever the lens barrel is retracted and projected, and the spur gear 16 is long enough to maintain this engagement in the optical axis direction.

The spur gear 16 rotates at a constant position around a spur gear shaft 18 held by the fixture cam ring 15 and the image pickup device holder 11. A zoom motor unit 17 is fixed onto the image pickup device holder 11 by a plurality of screws. A zooming initial position is detected when a light shield (not illustrated) on the driving cam ring 7 is inserted into a space between a light emitter and a light receiver of a photo-interrupter 26 fixed onto the image pickup device holder 11.

Figure 7:
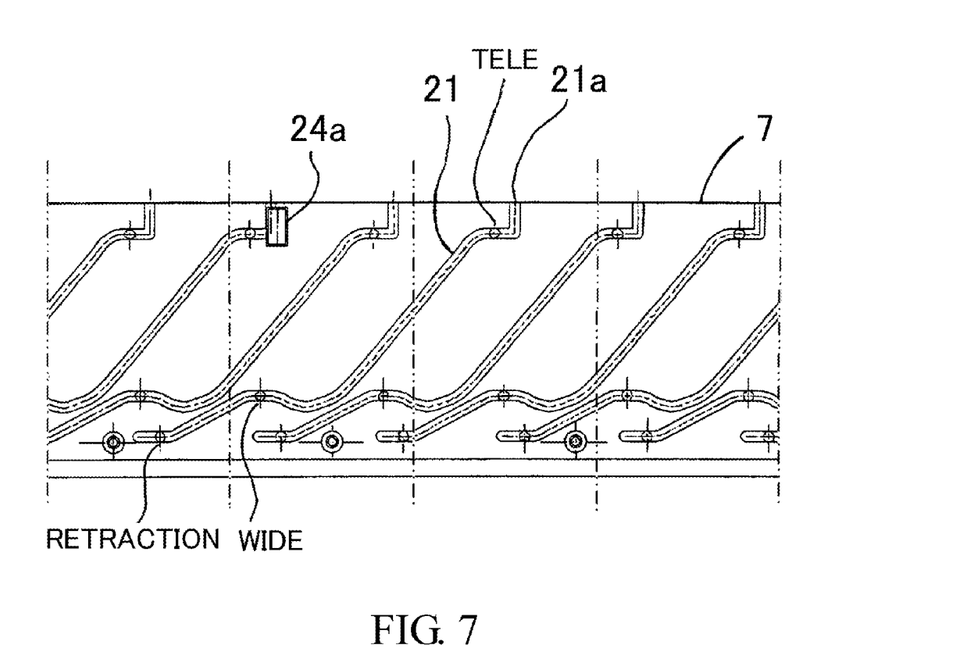
FIG. 7 is a developed view that illustrates an outer circumferential surface of the driving cam ring of the lens barrel according to this embodiment.

As illustrated in FIG. 7, six cam grooves (outer circumferential cams) 21 for the first barrel 1 are formed at regular intervals of 60° in the circumferential direction on an outer circumferential surface of the surrounding wall of the driving cam ring 7. Three of six cam grooves 21 are used to move the first barrel 1 in the optical axis direction (as will be described later). While six cam grooves 21 are merely illustrative, and the number of cam grooves 21 is not limited.

Figure 8:
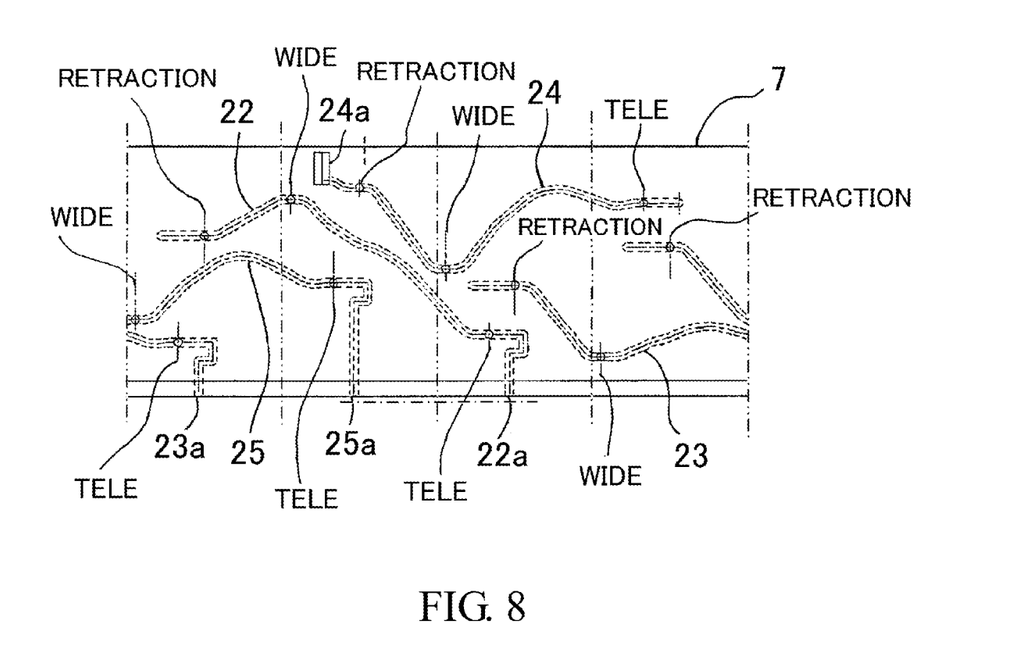
FIG. 8 is a developed view that illustrates an inner circumferential surface of the driving cam ring of the lens barrel according to this embodiment.

As illustrated in FIG. 8, cam grooves (inner circumferential cams) 22, 23, 24, and 25 configured to move the second holder frame 2, the stop/shutter unit 6, and the shift unit 3, and the fourth holder frame 4 in the optical axis direction are provided one each on the inner circumferential surface of the surrounding wall of the driving cam ring 7. Although the cam grooves 22, 23, 24, and 25 are provided one each for illustrative purposes, the number of cam grooves is not limited.

The cam grooves 15a formed on the fixture cam ring 15 are engaged with the cam pins 7b of the driving cam ring 7, as described above. The driving cam ring 7 is moved relative to the fixture cam ring 15 in the optical axis direction while the driving cam ring 7 is rotated around the optical axis, and the first barrel 1, the second holder frame 2, the stop/shutter unit 6, the shift unit 3, and the fourth holder frame 4 are moved in the optical axis direction relative to each other as the driving cam ring 7 rotates around the optical axis. Thereby, magnification variation (zooming) is performed between the wide-angle end state illustrated in FIG. 3 and the telephoto end state illustrated in FIG. 4, and the lens barrel can be displaced from the wide-angle end state to the retraction state illustrated in FIG. 2.

As illustrated in FIG. 9, a movement-gear groove 15d is formed in order to maintain a movement space of the movement gear 19 configured to move in the optical axis direction with the driving cam ring 7 from the front end to the intermediate position of the fixture cam ring 15.

Figure 5:
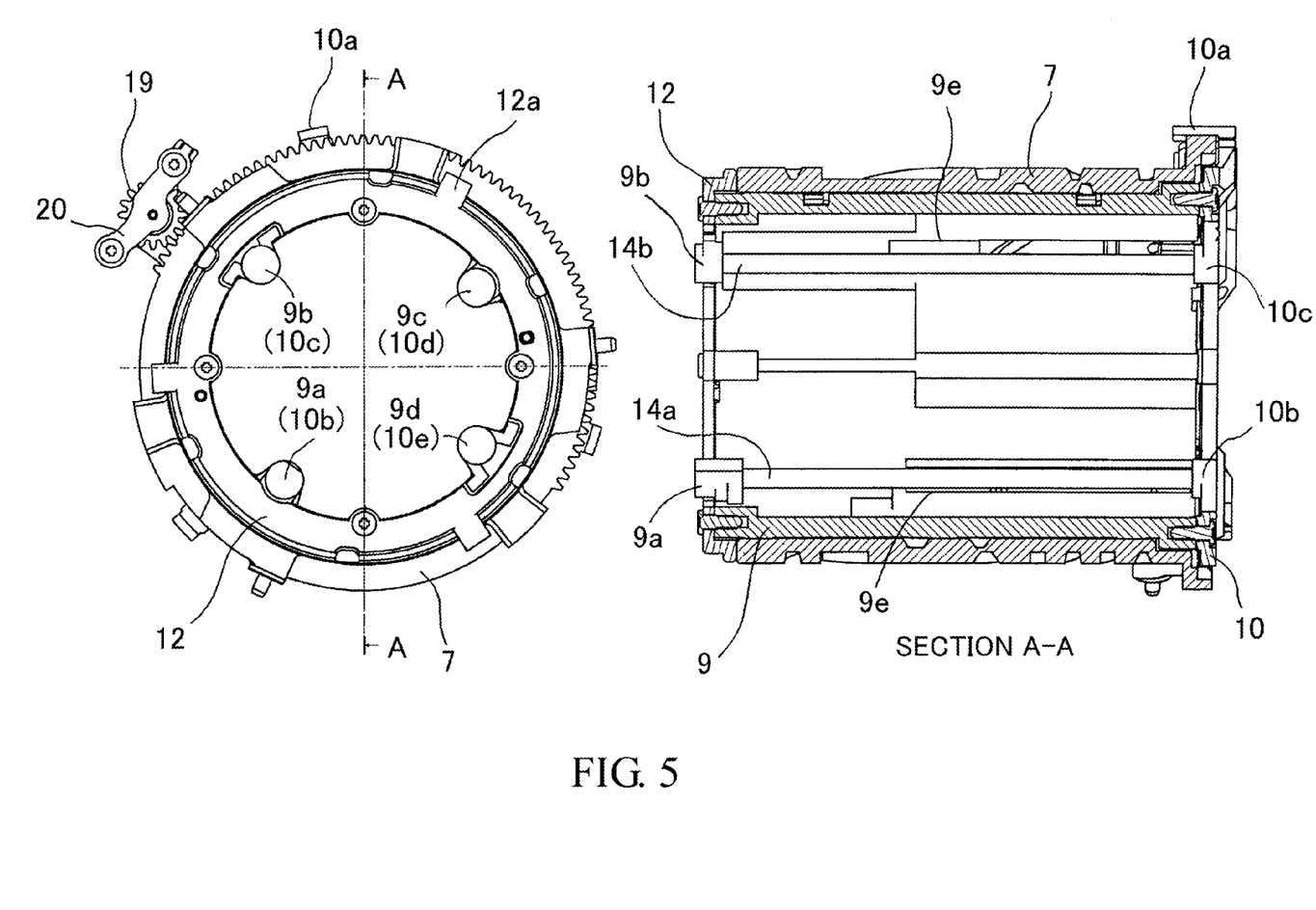
FIG. 5 is a sectional view of a straightforward movement guidance cylinder and a driving cam ring of the lens barrel according to this embodiment.
Figure 6A:
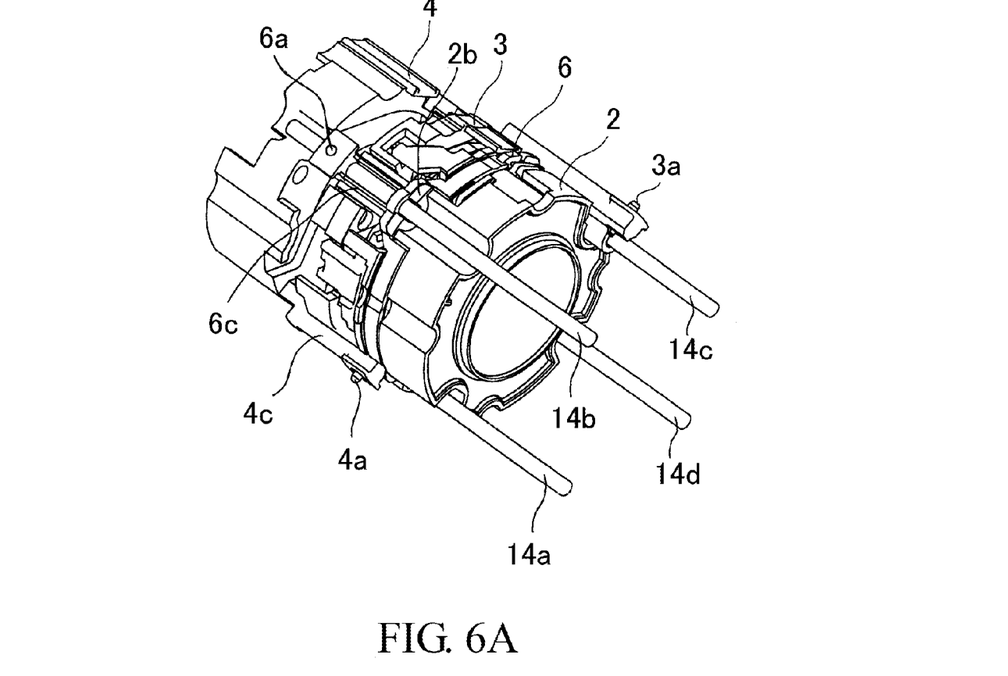
FIGS. 6A and 6B are perspective views that illustrate a second holder frame, a stop/shutter unit, a shift unit, and a fourth holder frame in the lens barrel according to this embodiment.
Figure 6B:
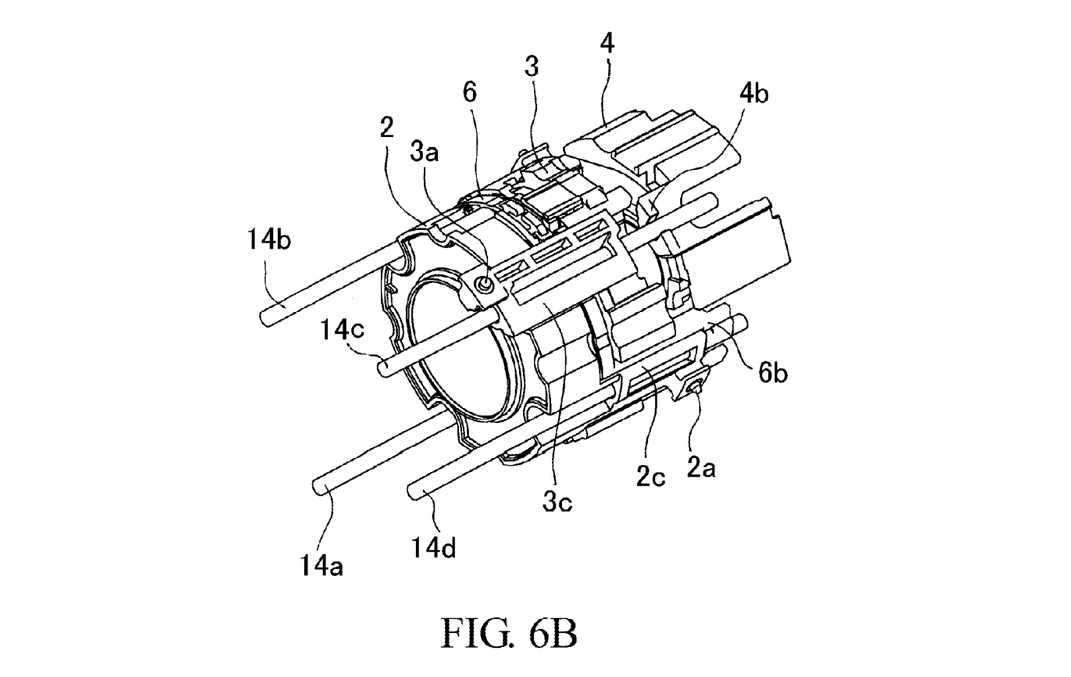

Referring now to FIGS. 5, 6A and 6B, a description will be given of support structures of the second holder frame 2, the stop/shutter unit 6, the shift unit 3, and the fourth holder frame 4.

As illustrated in FIG. 5, bar receivers 9a to 9d are formed near the front end of the straightforward movement guidance cylinder 9, and these bar receivers 9a to 9d hold one ends of guide bars 14a to 14d that are rod-shaped guide members. In addition, bar receivers 10b to 10e are also formed on the bar holder 10, and these bar receivers 10b to 10e hold the other ends of the guide bars 14a to 14d.

As illustrated in FIGS. 6A to 6B, a sleeve 2c of the second holder frame 2 is engaged with the guide bar 14d, and a U-shaped groove 2b is engaged with the guide bar 14b movably in the optical axis direction. A sleeve 6c of the stop/shutter unit 6 is engaged with the guide bar 14b, and a U-shaped groove 6b is engaged with the guide bar 14d movable in the optical axis direction. Thus, in the embodiment, the second holder frame 2 and the stop/shutter unit 6 that contact each other oppose the guide bars engaged with the sleeves 2c and 6c.

In addition, a sleeve 3c of the shift unit 3 is engaged with the guide bar 14c and a U-shaped groove (not illustrated) is engaged with the guide bar 14a movable in the optical axis direction. A sleeve 4c of the fourth holder frame 4 is engaged with the guide bar 14a, and a U-shaped groove 4b is engaged with the guide bar 14c movable in the optical axis direction. Thus, the shift unit 3 and the fourth holder frame 4 oppose the guide bars engaged with the sleeves 3c and 4c.

A cam pin 2a that serves as a cam follower is provided onto the second holder frame 2 near the sleeve 2c. A cam pin 6a is provided onto the stop/shutter unit 6 near the sleeve 6c. A cam pin 3a is provided onto the shift unit 3 near the sleeve 3c. A cam pin 4a is provided near the sleeve 4c in the fourth holder sleeve 4.

These cam pins 2a, 3a, 6a, and 4a perforate four straightforward movement grooves 9e that are formed on the surrounding wall of the straightforward movement guidance cylinder 9 and extend in the optical axis direction. These cam pins are engaged with the second-holder-frame cam groove 22, the stop/shutter-unit cam groove 23, the shift-unit cam groove 24, and the fourth-holder-frame cam groove 25 illustrated in FIG. 8. Thereby, as the driving cam ring 7 rotates around the optical axis (around the straightforward movement guidance cylinder 9), the second holder frame 2, the stop/shutter unit 6, the shift unit 3, and the fourth holder frame 4 are driven in the optical axis direction through lifting of the cam grooves 23 to 25.

This embodiment describes the four guide bars 14a to 14d configured to guide the four second optical units, such as the second holder frame 2, the stop/shutter unit 6, the shift unit 3, and the fourth holder frame 4, in the optical axis direction. However, it is unnecessary to provide four guide bars configured to guide these four second optical units in the optical axis direction, and three or fewer guide bars may be provided. For example, the sleeve 2c of the second holder frame 2 and the sleeve 4c of the fourth holder frame 4 may be engaged with the same guide bar.

Next, a description will be given of the support structure of the first barrel 1. As illustrated in FIG. 1, three keys 12a are formed in the circumferential direction (at regular intervals of 120°) on the outer circumference of the key ring 12 fixed onto the front end of the straightforward movement guidance cylinder 9. These three keys 12a are engaged with three straightforward movement groove (not illustrated) formed in the circumferential direction on the inner circumference surface of the surrounding wall of the first barrel 1, and guide the first barrel 1 in the optical axis direction while its radial position is determined so that the first barrel 1 cannot decenter relative to the optical axis.

Each of the key ring 12 and the bar holder 10 is a separate member from the straightforward movement guidance cylinder 9 but fixed integrally with the straightforward movement guidance cylinder 9. Therefore, the key 12a and the bar receivers 10b to 10e can be considered to be provided to the straightforward movement guidance cylinder 9.

As illustrated in FIGS. 1 and 2, six cam pins 1a each of which serves as a cam follower is provided on the back end on the inner circumferential surface of the first barrel 1 in the circumferential direction (at regular intervals of 60°), and each cam pin 1a is engaged with each cam groove 21 formed on the outer circumferential surface of the driving cam ring 7, as described above. Thereby, when the driving cam ring 7 is rotated around the straightforward movement guidance cylinder 9, the first barrel 1 is moved in the optical axis direction by the lifter of the cam groove 21.

The positions of the first barrel 1, the second holder frame 2, the stop/shutter unit 6, the shift unit 3, and the fourth holder frame 4 in the optical axis direction are determined by a composition of a driving amount of the driving cam ring 7 caused by the cam groove 15a of the fixture cam ring 15 and the driving amounts of the cam grooves 21 to 25 of the driving cam ring 7.

The cam pins 1a, 2a, 6a, and 4a may be formed integrally with the first barrel 1, the second holder frame 2, the stop/shutter unit 6, and the fourth holder frame 4 or formed separately from them and fixed through press fitting or adhesions. However, in this embodiment, as described later, the cam pin 3a needs to be manufactured as a separate member from the shift unit 3.

In this embodiment, a distance between the first lens unit L1 and the second lens unit L2 in the optical axis direction in the telephoto end state is larger than that in the wide-angle end state, and the first barrel 1 configured to hold the first lens unit L1 project ahead of the straightforward movement guidance cylinder 9 and the driving cam ring 7. Therefore, for example, a very long guide bar is required for the structure in which the guide bar held on the first barrel 1 supports the second holder 2.

Hence, in this embodiment, the first barrel 1 is guided by an engagement between the key 12a provided on the outer circumferential front end (key ring 12) of the straightforward movement guidance cylinder 9 and the straightforward movement groove formed on the inner circumferential surface of the first barrel 1. The other four optical units 2, 6, 3, and 4 are guided in the optical axis direction by the guide bars 14a to 14d held inside of the linear movement guidance cylinder 9. This configuration can avoid a large size of the lens barrel associated with use of a long guide bar and a degradation of the optical performance caused by the decentering and inclinations of the first barrel 1 and/or the second holder frame 2.

In this embodiment, decentering and inclinations between the first barrel 1 and the other four optical units 2, 6, 3, and 4 need to be effectively prevented (or it is necessary to reduce the decentering and the inclination down to a level within a permissible range). Thus, the first barrel 1 includes a decentering/inclination adjustment mechanism (not illustrated) for this purpose.

In addition, the four second optical units 2, 6, 3, and 4 supported by the guide bars 14a to 14d also need high precision for decentering and inclination, but only a few or only two components configured to support the guide bars 14a to 14d in this embodiment, such as the straightforward movement guidance cylinder 9 and the bar holder 10. Therefore, the four second optical units 2, 6, 3, and 4 can be supported movable in the optical axis direction while the decentering and inclinations can be effectively reduced.

This embodiment describes the guide bars 14a to 14d held by the straightforward movement guidance cylinder 9 and the bar holder 10 fixed onto the straightforward movement guidance cylinder 9. Alternatively, the part corresponding to the bar holder 10 may be integrally formed on the straightforward movement guidance cylinder, and the guide bars 14a to 14d may be held only by the straightforward movement guidance cylinder.

Referring now to FIG. 8, a description will be given of the cam grooves 22, 23, 24, and 25 for the second holder frame, the stop/shutter unit, the shift unit, and the fourth holder frame. In FIG. 8, the lower side corresponds to the image side (backside) and the upper side corresponds to the object side (front side).

As described above, the second-holder-frame cam groove 22, the stop/shutter-unit cam groove 23, the shift-unit cam groove 24, and the fourth holder frame cam groove 25 are formed one each on the inner circumferential surface of the driving cam ring 7. Each cam groove has a shape (locus) configured to move the corresponding optical unit in the optical direction in order of and in reverse order of the retraction position, the wide-angle end position, and the telephoto end position.

The cam pin insertion openings 22a, 23a, and 25a are formed at the back end of the surrounding wall of the driving cam ring 7 so as to introduce the cam pins 2a, 6a, and 4a to the second-holder-frame cam groove 22, the stop/shutter-unit cam groove 23, and the fourth holder frame cam groove 25. The cam pin insertion openings 22a, 23a, and 25a are connected to the telephoto end side of the cam grooves 22, 23, and 25 (opposite to the retraction position side).

The cam pin insertion opening 24a is formed and serves as a perforation hole used to introduce the cam pin 3a of the shift unit 3 into the shift-unit cam groove 24 so that it perforates the surrounding wall of the driving cam ring 7. The cam pin insertion opening 24a is connected to the retraction position side of the cam groove 24 (opposite to the telephoto end position). After the shift unit 3 is assembled into the driving cam ring 7, the cam pin 3a is fixed onto the shift unit 3 and introduced into the cam groove 24 by press-fitting the cam pin 3a into a hole formed in the shift unit 3 through the cam pin insertion opening 24a.

The retraction position, the wide-angle end position, and the telephoto end position of the cam grooves 22, 23, 24, and 25 are formed in the circumferential direction so that their phases can shift by 45° corresponding to regular intervals of 45° of the cam pins 2a, 6a, 3a, and 4a in the circumferential direction.

Referring now to FIG. 7, a description will be given of the first-barrel cam groove 21. In FIG. 7, the lower side corresponds to the image plane side (backside) and the upper side corresponds to the subject side (front side).

As described above, six first-barrel cam grooves 21 are formed on the outer circumferential surface of the driving cam ring 7, and engaged with six cam pins 1a provided on the first barrel 1.

However, three driving cam grooves out of these six cam grooves 21 are arranged at intervals of 120° and used to move the first barrel 1 in the optical axis direction in order of and in reverse order of the retraction position, the wide-angle end position, and the telephoto end position. The other three cam grooves 21 are impact-resistant cam grooves used to maintain the impact-resistance and an engagement between the cam pin 1a and the driving cam groove when the first barrel 1 receives an impact in the image plane direction, etc. The impact-resistant cam groove is formed at a predetermined clearance with the cam pin 1a at the normal operation time. The driving cam groove has a shape (locus) in order to move the first barrel 1 in the optical axis direction in order of and in reverse order of the retraction position, the wide-angle end position, and the telephoto end position.

The cam pin 1a provided to the first barrel 1 is introduced into the cam groove 21 through the cam pin insertion opening 21a formed in a front end surface of the driving cam ring 7. The cam pin insertion opening 21a is connected to the cam groove 21 on the telephoto end position side (opposite to the retraction position side).

In the fixture cam ring 15 illustrated in FIG. 9, the movement-gear groove 15d is formed so that the movement-gear groove 15d passes a space between the retraction position and the wide-angle end position in one of three cam grooves 15a and extends in the optical axis direction. The part in the one cam groove 15a through which the movement-gear groove 15d passes is an imperfect area that as a non-engagement area in which the cam pin 7b is not engaged in this cam groove member 15a. In this imperfect area, the cam pin 7b of the driving cam ring 7 slips off from the cam groove 15a. When the cam pin 7b is slipping off, a support of the driving cam ring 7 may become temporarily unstable because the driving cam ring 7 is supported relative to the fixture cam ring 15 only by the engagements between the two cam pins 7b and the other two cam grooves 15a.

However, according to this embodiment, the engagement between the straightforward movement key (supported member) 10a formed on the bar holder 10 and the straightforward movement groove (supporting member) 15b formed on the inner circumferential surface of the fixture cam ring 15 determines a radial position of the back end of the driving cam ring 7 (or movement cylinder).

In addition, as illustrated in FIGS. 2 and 3, between the retraction state and the wide-angle end state, the fixture cam ring 15 supports the outer circumferential surface of the first barrel 1 via flocked paper 51 that serves as an elastic member and is adhered near the front end on the inner surface. As described above, the key 12a of the key ring 12 fixed onto the front end of the straightforward movement guidance cylinder 9 is engaged with the straightforward movement groove formed on the inner circumference surface of the first barrel 1. Therefore, the support of the first barrel 1 by the flocked paper 51 corresponds to the support of the front end of the driving cam ring 7 (part in front of the straightforward movement key 10a). Thereby, a radial position of the front end can be determined by the driving cam ring 7 (or movement cylinder).

Since the back end side of the driving cam ring 7 and the portion closer to the front end side are thus supported in the radial direction, the inclination of the driving cam ring 7 can be restrained when the cam pin 7b slips off. Since the imperfect area of the cam groove 15a is located between the retraction position and the wide-angle end position in this embodiment, the image pickup is not affected between the wide-angle end state and the telephoto end state even when the slight inclination of the driving cam ring 7 occurs due to an elastic deformation of the flocked paper 51.

The flocked paper 51 is arranged on three areas in the circumferential direction on the inner circumferential direction of the fixture cam ring 15. The outer circumferential surface of the first barrel 1 as an exterior of the camera is slid relative to the flocked paper 51. The outer circumferential surface of the first barrel 1 may be protected from this sliding by using a highly elastic material for the flocked paper 51. Due to this elasticity, even when the cam pin 7b once slipping off is again engaged with the cam groove 15a, zooming is not prevented by the multiple engagements. Even when a rigid material is used, the multiple engagements occur because the positions of the three cam pins arranged on the image pickup device side and the two spots on the outer circumferential surface on the barrel object side are determined. The multiple engagements may increase the load of the barrel and negatively affect zooming.

Figure 11:
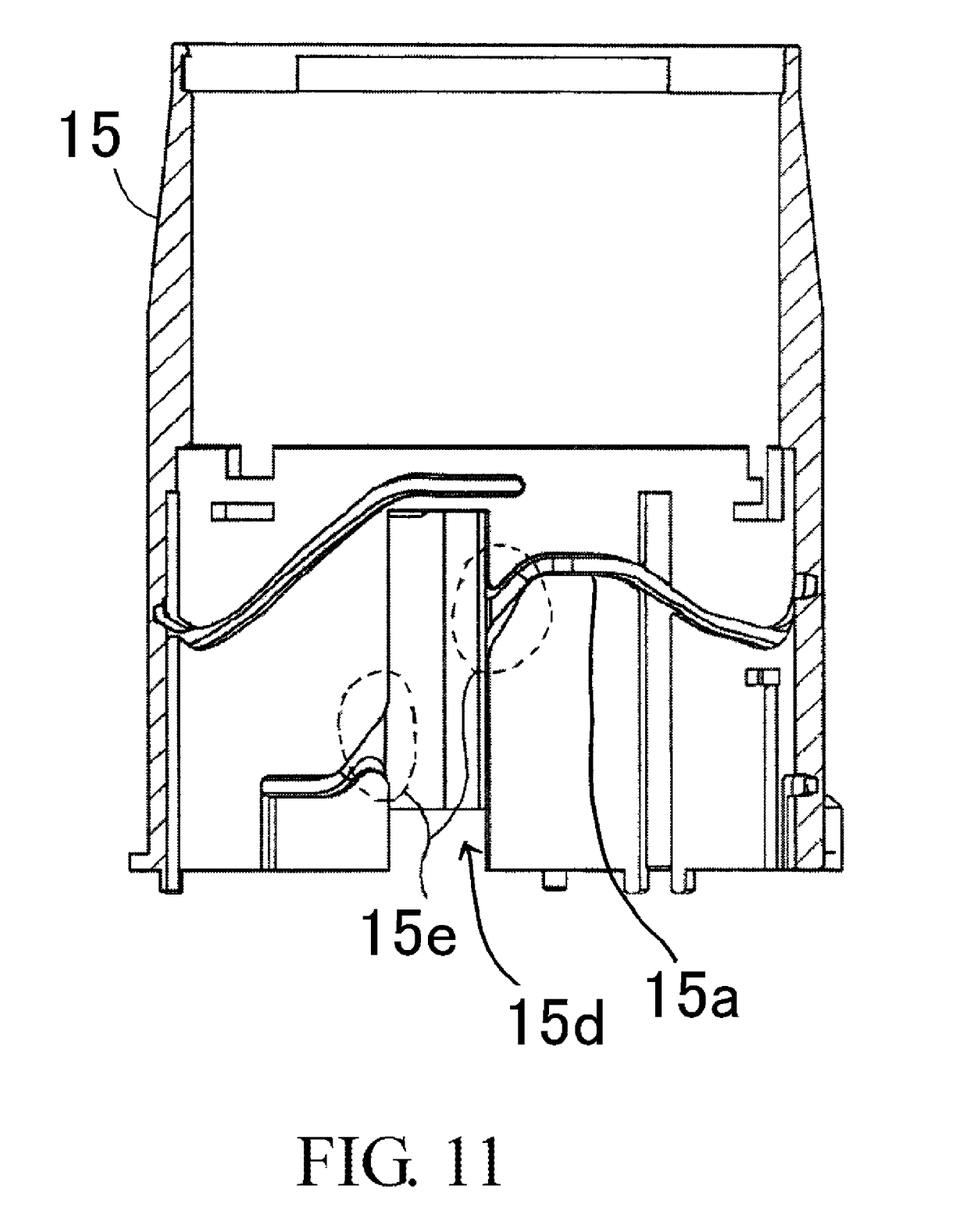
FIG. 11 is a sectional view of the fixture cam ring of the lens barrel according to this embodiment.

FIG. 11 illustrates a section of the fixture cam ring 15. The area 15e adjacent to the imperfect area of cam groove 15a formed by the movement-gear groove 15d among the cam grooves 15a will be referred to as a reset guide area in the following description. This reset guide area 15e has a taper shape or a curved surface shape which has a width larger than that of another part between the retraction position and the telephoto end position in the cam groove 15a. When the cam pin 7b slips off from the cam groove 15a, the cam pin 7b guided by the taper shape or curved surface shape of the reset guide area 15e can be smoothly again engaged with the cam groove 15a even when the driving cam ring 7 inclines and the cam pin 7b shifts from the locus of the cam groove 15a.

Thereby, when the cam pin 7b passes the imperfect area of the cam groove 15a at the operation time between the retraction position and the wide-angle end position, a hook of the cam pin 7b or unsteadiness of the inclination of the driving cam ring 7 can be restrained.

This embodiment can provide an image pickup apparatus that can restrain inclination and decentering of the movement cylinder even when the cam follower slips off in the non-engagement area of the cam groove.

While the present invention has been described with reference to exemplary embodiments, it is to be understood that the invention is not limited to the disclosed exemplary embodiments.

For example, instead of the flocked paper 51 used for the above embodiment, another elastic member may be used, such as felt and a rubber ring. While this embodiment describes the imperfect area of the cam groove 15a between the retraction position and the wide-angle end position, the imperfect area may be located between the wide-angle end position and the telephoto end position.

The scope of the following claims is to be accorded the broadest interpretation so as to encompass all such modifications and equivalent structures and functions.

This application claims the benefit of Japanese Patent Application No. 2009-216614, filed Sep. 18, 2009 which is hereby incorporated by reference herein in its entirety.

What is claimed is:

1. An image pickup apparatus comprising a lens barrel, wherein said lens barrel includes:
   a fixture cylinder fixed onto an image pickup apparatus body, the fixture cylinder including a supporting member and a plurality of cam grooves;
   a movement cylinder that includes a plurality of cam followers and a supported member that is provided to a part of the movement cylinder on an image plane side, and is configured to move in an optical axis direction as the cam follower rotates around an optical axis; and
   an elastic member,
   wherein one of the plurality of cam grooves has a non-engagement area in which the cam follower is not engaged with the one cam groove, and
   wherein when the cam follower is located in the non-engagement area, the supporting member of the fixture cylinder supports in a radial direction the supported member of the movement cylinder, and a part of the movement cylinder closer to the object side than the supported member is supported by the fixture cylinder in the radius direction via the elastic member.

2. The image pickup apparatus according to claim 1, wherein the non-engagement area is provided to the cam groove between a position that enables the movement cylinder to be housed in the fixture cylinder and a position that enables the movement cylinder to project from the fixture cylinder to an image pickup standby position.

3. The image pickup apparatus according to claim 1, further comprising a guide area adjacent to the non-engagement area in the cam groove and configured to guide the cam follower in the non-engagement area to an engagement with the cam groove.

* * * * *